United States Patent
Fujita

(10) Patent No.: US 7,658,559 B2
(45) Date of Patent: Feb. 9, 2010

(54) LENS-SHUTTER COUPLING UNIT

(75) Inventor: Hideaki Fujita, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 476 days.

(21) Appl. No.: 11/580,595

(22) Filed: Oct. 13, 2006

(65) Prior Publication Data

US 2007/0086777 A1 Apr. 19, 2007

(30) Foreign Application Priority Data

Oct. 13, 2005 (JP) .......................... P2005-299270

(51) Int. Cl.
 *G03B 9/08* (2006.01)
(52) U.S. Cl. ...................... 396/463; 396/529
(58) Field of Classification Search ................ 396/451, 396/452, 462, 463, 505, 508
See application file for complete search history.

(56) References Cited

U.S. PATENT DOCUMENTS

| | | | |
|---|---|---|---|
| 4,702,583 A | 10/1987 | Yoshino et al. | |
| 6,779,933 B2 * | 8/2004 | Sato et al. | 396/463 |
| 2002/0154419 A1 | 10/2002 | Shoji et al. | |
| 2003/0219243 A1 | 11/2003 | Tanaka et al. | |
| 2005/0088757 A1 | 4/2005 | Tsuzuki | |
| 2006/0029385 A1 * | 2/2006 | Huang | 396/452 |

FOREIGN PATENT DOCUMENTS

| | | |
|---|---|---|
| EP | 0 942 321 | 9/1999 |
| JP | 62-131238 | 6/1987 |
| JP | 2000-122109 | 4/2000 |
| JP | 2000-310803 | 11/2000 |
| JP | 2001-066486 | 3/2001 |
| JP | 2002-318335 | 10/2002 |
| JP | 2004-347615 | 12/2004 |
| JP | 2005-037866 | 2/2005 |
| JP | 2005-128452 | 5/2005 |

\* cited by examiner

*Primary Examiner*—W. B. Perkey
(74) *Attorney, Agent, or Firm*—Edwards Angell Palmer & Dodge LLP; David G. Conlin; Peter J. Manus

(57) ABSTRACT

A lens-shutter coupling unit having a coupling structure of a lens shutter and a shutter unit capable of miniaturization and high-precision arrangement of a lens group, is provided. A shutter driving part for moving shutter blades and a filter driving part for moving an ND filter are disposed near an outer periphery of a protruding part of a lens group that protrudes from a barrel. The shutter driving part and the filter driving part can be disposed in a position (inner periphery) near an optical axis of the lens group. The center of rotation of the shutter blades and the ND filter can also be disposed near the optical axis of the lens group, and the shutter blades and the ND filter can be reduced in size. As a result, since the space at the time of retreat can be reduced, the shutter unit can be reduced in size.

10 Claims, 3 Drawing Sheets

LENS-SHUTTER COUPLING UNIT

CROSS-REFERENCE TO RELATED APPLICATION

This application claims priority to Japanese Patent Application No. JP 2005-299270, which was filed on Oct. 13, 2005, the contents of which, are incorporated herein by reference, in their entirety.

BACKGROUND OF THE INVENTION

1. Field of the Invention

The present invention relates to a lens-shutter coupling unit to be used for an optical instrument, such as an camera, and having a coupling structure of a mechanical shutter and a lens shutter.

2. Description of the Related Art

In the related art, a camera or the like including an image pickup optical system composed of a plurality of lenses has been used widely. An object image that is formed on the basis of a light beam entering the image pickup optical system is focused on an image pickup device, such as an image sensor using a charge-coupled device (CCD), i.e., a CCD image sensor, which is disposed in a predetermined position. In such a camera, in order to facilitate incorporation of the camera into a portable terminal in addition to enhancements in functions, such as a zooming function and a focusing function, and realization of high resolution, the camera is desired to be further reduced in size. Therefore, it is indispensable to miniaturize a light-quantity adjuster, such as a shutter unit for adjusting the quantity of light according to the brightness of an object. Generally, the size of the shutter unit depends on the diameter of an exposure opening, an arrangement space for shutter blades that shields the exposure opening, an ND (Neutral Density) filter, and the like, and an arrangement space for driving units for operating the shutter blades, the ND filter, and the like. Further, generally, a camera having a zooming function is configured such that a zooming lens group and a shutter unit are operated integrally in order to decrease the diameter of the opening.

In an example of the configuration for miniaturizing the shutter unit, a step motor is disposed around a lens barrel (lens holder) to operate shutter blades (for example, see Japanese Unexamined Patent Publication JP-A 62-131238 (1987) (FIGS. 1 and 2)). Further, the configuration of a lens holding frame (lens holder) for attaching a lens to a shutter unit is also disclosed (for example, see Japanese Unexamined Patent Publication JP-A2002-318335 (FIGS. 1 and 2)). The lens holding frame includes a lens receiving barrel and an arm part. The lens receiving barrel receives the lens so as to surround a periphery thereof, and the barrel is provided with a lens supporting part that abuts on the other surface of the lens. The arm part is formed integrally with the outer periphery of the lens receiving barrel, and is bent in the direction of an optical axis when it is connected to a connecting part provided in the shutter unit to push the lens barrel unit against the shutter unit. A biasing force generated by bending of the arm part causes the lens to be sandwiched between the lens supporting part and a lens abutting surface of the lens shutter, thereby facilitating positional adjustment and holding of the lens.

In the configuration disclosed in JP-A 62-131238, a driving unit for the shutter blades is disposed at an outer periphery of the lens holder. The lens holder has such a thickness that it receives the lens. Accordingly, the driving unit has to be disposed further outside than the outer diameter of the lens by the thickness of the lens holder, and consequently the shutter unit cannot be reduced in size sufficiently. Further, since the driving unit is disposed in a position apart from the optical axis, and the center of rotation of the shutter blades is apart from the optical axis, it is necessary to enlarge the shutter blades themselves, and therefore it is difficult to miniaturize the shutter unit.

In the configuration disclosed in JP-A 2002-318335, in order to align the lens with the shutter unit, it is necessary to adjust the position of the lens, and consequently the assembling becomes complicated. Further, the publication does not disclose a configuration to miniaturize the shutter unit.

SUMMARY OF THE INVENTION

The invention has been made in consideration of the above circumstances. It is therefore an object of the invention to provide a lens-shutter coupling unit having a coupling structure of a lens shutter and a shutter unit capable of size reduction and high-precision arrangement of a lens group.

The invention provides a lens-shutter coupling unit comprising:

a lens holder that is movable in a direction of an optical axis, having a lens holder main body and a lens fixing frame;

a lens group that is attached to the lens fixing frame;

a shutter unit that is fixed to the lens holder;

a light quantity control member that is disposed within the shutter unit; and a driving part that drives to move the light quantity control member so that the control member may perform a light quantity control operation, wherein the shutter unit is formed with an opening in a position that faces the light quantity control member, the lens fixing frame of the lens holder is inserted into the opening, the lens group attached to the lens fixing frame has a protruding part that protrudes toward the light quantity control member of the shutter unit from the lens fixing frame, and the driving part is disposed in the vicinity of an outer periphery of the protruding part.

According to the invention, the lens-shutter coupling unit has the lens holder, the lens group, the shutter unit, the light quantity control member, and the driving part. In addition, it is assumed that the lens group also includes a single lens. The lens group is attached to the lens fixing frame of the lens holder that is movable in the direction of the optical axis. Since the lens group is attached to the lens fixing frame rather than the shutter unit, the lens group can be attached with high precision. The light quantity control member is disposed within the shutter unit, and is moved by driving by the driving part to perform a light quantity control operation. The lens fixing frame of the lens holder is inserted into the opening formed in a position that faces the light quantity control member. Further, the protruding part of the lens group protrudes toward the light quantity control member from the lens fixing frame to be inserted into the opening. The light quantity control member can perform a light quantity control operation in a position close to the protruding part of the lens group. Since the driving part is disposed in the vicinity of the outer periphery of the protruding part, the driving part can be disposed closer to the optical axis than being disposed in the vicinity of the outer periphery of the protruding part by the thickness of the lens fixing frame, and thus the shutter unit can be reduced in size. Further, the center of rotation of the light quantity control member can be disposed in a position close to the optical axis of the lens group, and thus the light quantity control member can be miniaturize. As a result, the lens unit in which the light quantity control member is to be disposed can also be reduced in size.

According to the invention, since the driving part of the light quantity control member can be disposed in the vicinity of the protruding part, the driving part can be disposed at an inner periphery that is a position close to the optical axis of the lens group, and thus the shutter unit can be reduced in size. Further, since the center of rotation of the light quantity control member can be disposed in a position close to the optical axis of the lens group, the light quantity control member can be reduced in size, and thus the shutter unit can also be reduced in size with the miniaturization of the light quantity control member. Moreover, since the lens group is held by the lens fixing frame rather than the shutter unit, the lens group can be attached with high precision.

Further, in the invention, it is preferable that the light quantity control member is shutter blades that are movable between a position where an exposure opening of the shutter unit is shielded and a position where the exposure opening is opened.

According to the invention, since a driving part of the shutter blades that are movable between a position where the exposure opening of the shutter unit is shielded and a position where the exposure opening is opened is disposed in a position close to the optical axis of the lens group, the shutter unit that opens and closes an optical path of the lens group in the exposure opening can be reduced in size.

According to the invention, since the driving part of the shutter blades is disposed in the vicinity of the protruding part, the shutter unit can be reduced in size.

Further, in the invention, it is preferable that the light quantity control member is an ND filter that can be displaced between a position in the optical path within the shutter unit and a position of retreat from the optical path.

According to the invention, since a driving part of the ND filter that can be displaced between a position in the optical path within the shutter unit and a position of retreat from the optical path is disposed in a position close to the optical axis of the lens group, it is possible to approximately equally suppress transmission of light beams corresponding to wavelengths within a visible spectrum range in the optical path of the lens unit. As a result, the shutter unit that performs control of the quantity of light can be reduced in size.

According to the invention, since the driving part of the ND filter can be disposed in the vicinity of the protruding part, the shutter-unit can be reduced in size.

Further, in the invention, it is preferable that the light quantity control member is both shutter blades that are movable between a position where an exposure opening of the shutter unit is shielded and a position where the exposure opening is opened, and an ND filter that can be displaced between a position in the optical path within the shutter unit and a position of retreat from the optical path, and the light quantity control member is provided with a driving part to operate the shutter blades and a driving part to operate the ND filter, and is disposed in a position that is substantially symmetrical with respect to the optical axis of the lens group.

According to the invention, since control of the quantity of light within the shutter unit is performed by both the shutter blades and the ND filter, and the driving parts of the shutter blades and the ND filter are disposed in positions that are substantially symmetrical with respect to the optical axis, the space for lens unit can be used effectively, and thus the shutter unit can be reduced in size.

According to the invention, by disposing the driving parts in positions that are substantially symmetrical with respect to the optical axis of the lens group, the space for the shutter unit can be used more effectively and thus the shutter unit can be reduced in size.

Further, in the invention, it is preferable that the lens group is composed of a plurality of lenses, and a lens protruding from the lens fixing frame that is to be a protruding part is bonded to a lens to be attached to the lens fixing frame.

According to the invention, since a lens that becomes the protruding part is bonded to a lens to be attached to the lens fixing frame, it is unnecessary to attach the lens that becomes the protruding part to the lens fixing frame. As a result, the protruding part is lengthened. Thus, a space where the driving part of the light quantity control member is to be disposed can be further broadened.

According to the invention, by using a combined lens for a lens that becomes the protruding part, one of the combined lens has only to be held by the lens fixing frame. Thus, since the protruding part can be lengthened, a space where the driving part of the light quantity control member is to be disposed can be further broadened. Therefore, the shutter unit can be further reduced in size.

Further, in the invention, it is preferable that the lens group is fixed to a tubular lens fixing frame that is formed separately from the lens holder main body, and the lens fixing frame is fixed to the lens holder main body.

According to the invention, the lens group is fixed to the lens fixing frame that is formed separately from the lens holder main body. Since the fixation of the lens group by the separate lens fixing frame can be performed with high precision even in a case where the lens fixing frame is integrated into the lens holder main body, tilting or positional deviation within the lens group can be reduced.

According to the invention, by fixing the lens group to the tubular lens fixing frame that is formed separately from the lens holder, it becomes easy to reduce tilting or axis deviation between lenses within the lens group, and it is possible to attach the lenses with high precision.

Further, in the invention, it is preferable that the lens fixing frame has at an outer periphery thereof a retaining part whose outer diameter is greater than those of other parts.

According to the invention, since the outer periphery of the lens fixing frame is provided with the retaining part whose outer diameter is greater than those of the other parts, if the retaining part is put into the lens holder and the shutter unit, the lens fixing frame can be prevented from deviating due to a falling impact, etc.

According to the invention, since the retaining part is formed in the lens fixing frame that is formed separately from the lens holder, the retaining part can be put into between the lens holder and the shutter unit, and the lens fixing frame can be prevented from deviating due to, for example, a falling impact, etc.

Further, in the invention, it is preferable that the lens fixing frame has a diaphragm part that restricts the diameter of light entering the lens group, on a side opposite to the protruding part in the direction of the optical axis.

According to the invention, since the lens fixing frame has the diaphragm part that restricts the diameter of light entering the lens group, on the side opposite to the protruding part in the direction of the optical axis, the number of components can be reduced compared with a case where an independent diaphragm part is provided. Since the lens group can be disposed in the lens fixing frame with high precision, the position of the diaphragm part can also be managed with high precision.

According to the invention, by adding a diaphragm function to the lens fixing frame, the number of parts can be reduced. Further, sine the lens group is disposed in the lens fixing frame with high precision, the position of the diaphragm part can also be handled with high precision.

Further, in the invention, it is preferable that the shutter unit has a rectangular external shape such that a part thereof where the driving part is disposed becomes a long side.

According to the invention, since the shutter unit has a rectangular external shape, it is possible to facilitate incorporation into a portable apparatus, such as a camera. Since the driving part is disposed on the long side of the rectangular external shape, the space for the shutter unit can be used effectively.

According to the invention, by forming the shutter unit into a rectangular shape, the volume of the shutter unit can be reduced, and a camera itself including the lens-shutter coupling unit can be easily formed into a rectangular shape that is suitable for incorporation into a portable terminal, etc.

Further, in the invention, it is preferable that the lens holder is formed integrally with a bearing part into which a guide shaft that guides movement of the lens holder in the direction of the optical axis is to be inserted.

According to the invention, since the lens holder is formed integrally with the bearing part into which a guide shaft that guides movement of the lens holder in the direction of the optical axis is to be inserted, the position precision of the bearing part and the optical axis of the lens group is managed, so that deviation of the optical axis can be reduced when the lens group is moved along with the lens holder.

According to the invention, even if the lens group is moved, fluctuation of the deviation of the optical axis can be reduced by forming the bearing part integrally with the lens holder to manage the position precision of the bearing part and the optical axis of the lens group.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
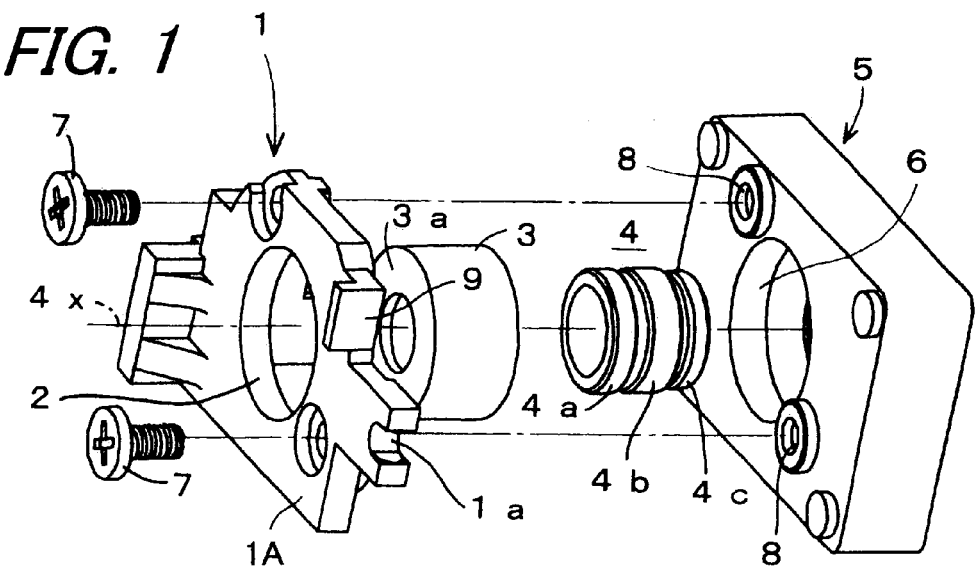
FIG. 1 is an exploded perspective view showing a schematic configuration of a lens-shutter coupling unit according to an embodiment of the invention.

Now referring to the drawings, preferred embodiments of the invention are described below.

Figure 2:
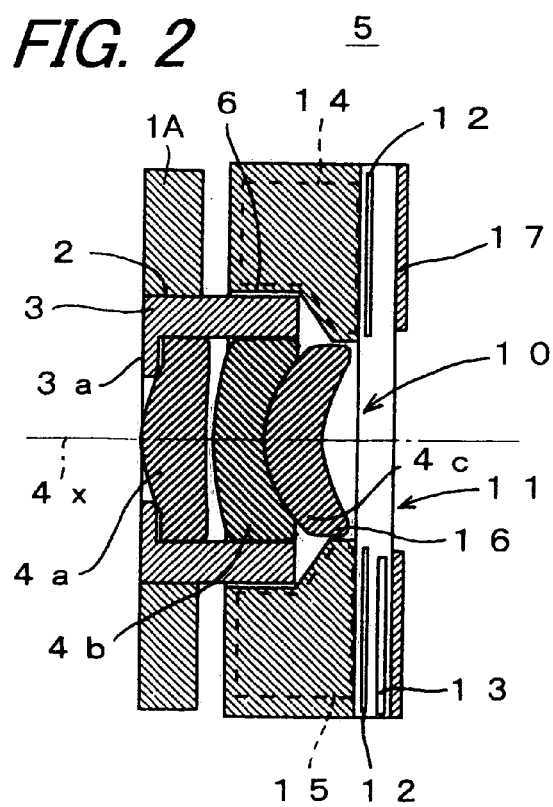
FIG. 2 is a side sectional view parallel to an optical axis, showing a schematic configuration of the lens-shutter coupling unit of FIG. 1.

FIGS. 1 and 2 show a schematic configuration of a lens-shutter coupling unit according to an embodiment of the invention. FIG. 1 is an exploded perspective view showing a coupling structure of a lens holder and a shutter unit, and FIG. 2 shows a sectional configuration of the lens holder and the shutter unit whey they are coupled with each other.

As shown in FIG. 1, a lens holder 1 comprises a lens holder main body 1A including a holder opening 2 and a barrel 3 that is a lens fixing frame. The barrel 3 is fixedly bonded to the holder opening 2. A lens group 4 is fixed to the barrel 3 by press-fitting or bonding. The lens group 4 is constituted of, for example, three lenses 4a, 4b, and 4c. Two lenses 4b and 4c of the three lenses on the side of a shutter unit 5 are combined lenses that are fixedly bonded to each other in advance. The shutter unit 5 is provided with an opening 6 through which the barrel 3 is to be inserted. When the lens holder 1 and the shutter unit 5 are coupled with each other, they are fixed to each other with fixing screws 7. The shutter unit 5 is provided with lower holes 8 for allowing the fixing screws 7 to be fastened thereto. The lens holder 1 is also provided with a rotation stopper 1a that extends sideways, an FPC (Flexible Printed Circuit) fixing part 9, and the like. A diaphragm part 3a is formed in the barrel 3 on the side of the lens unit 1 by reducing aperture diameter. ,The lens holder 1 is adapted to be able to move the lens group 4 in a direction of an optical axis 4x integrally with the shutter unit 5 to perform zooming and focusing at photographing magnification for an image pickup optical system. The lens holder 1, the barrel 3 and the shutter unit 5 is formed of, for example, a synthetic resin material. The lenses 4a, 4b, and 4c are formed of transparent glass or synthetic resin. The fixing screws 7 are formed of metal or synthetic resin.

As shown in FIG. 2, the center of the shutter unit 5 is provided with an opening 6 into which a portion of the barrel 3 is to be inserted, an exposure opening 10, and a filter opening 11. A plurality of shutter blades 12 that moves to shield the exposure opening 10, and an ND filter 13 that moves to cover the filter opening 11 to reduce light quantity are disposed between the exposure opening 10 and the filter opening 11.

The lens holder 1 is coupled with the shutter unit 5 such that a portion of the barrel 3 is inserted into the opening 6 of the shutter unit 5. The shutter unit 5, as shown in FIG. 1, is formed with the lower holes 8, and the lens holder 1 is fixed to the shutter unit 5 with the two fixing screws 7. Positioning of the lens holder 1 and the shutter unit 5 is performed by convex parts that are formed around the lower holes 8 of the shutter unit 5 and concave parts that are formed in the lens holder 1 so as to fit onto the convex parts.

As indicated by broken lines, a shutter driving part 14 for moving the shutter blades 12 and a filter driving part 15 for moving the ND filter 13 are disposed within the shutter unit 5. The lens 4c of the lens group 4 on the side of the exposure opening 10 has a protruding part 16 a portion of the external surface of which protrudes from the barrel 3. In the protruding part 16, the opening 6 of the shutter unit 5 is narrowed. The shutter driving part 14 and the filter driving part 15 are disposed at an outer periphery of the protruding part 16.

The shutter driving part 14 has a solenoid (not shown) for driving the shutter blades 12 and the filter driving part 15 has a solenoid (not shown) for driving the ND filter 13, wherein an iron core is displaced by energizing a coil (not shown). A lever (not shown) is pivotally supported on a back surface of a cover 17 of the shutter unit 5. The lever has its one end abutting on an end of the iron core so as to pivot by driving of the iron core. Further, the other end of the lever is provided with a projection (not shown) that protrudes through a slit (not shown) provided in the cover 17. The projection is engaged with the shutter blades 12 and the ND filter 13, and pivoting of the lever rotates the shutter blades 12 and the ND filter 13. This causes the shutter blades 12 and the ND filter 13 to interlock with the shutter lever to turn on/off the solenoid, so that the exposure opening 10 and the filter opening 11 can be opened and closed. An FPC (not shown) that is a flexible printed wiring board for inputting an electrical signal that turns on/off the solenoid is disposed in the shutter unit 5. This FPC is fixed to the FPC fixing part 9 formed in the lens holder 1, after the lens holder 1 and the shutter unit 5 are fixed. The above-described method of driving the shutter blades 12 and the ND filter 13 is an example. The shutter blades and the ND filter may be driven using, for example, a stepping motor or the like.

By disposing the shutter driving part 14 for moving the shutter blades 12 and the filter driving part 15 for moving the ND filter 13 in the vicinity of the outer periphery of the protruding part 16, the shutter driving part 14 and the filter driving part 15 can be located in a position (inner periphery) close to the optical axis of the lens group 4, and therefore the shutter unit 5 can be reduced in size. Further, the center of rotation of the shutter blades 12 and the ND filter 13 can also be located in a position close to the optical axis of the lens group 4, and therefore the shutter blades 12 and the ND filter 13 can be reduced in size. As a result, since the space at the time of retreat can be reduced, the shutter unit 5 can be reduced in size. In addition, although the example in which the ND filter 13 is used is shown in the embodiment shown in FIGS. 1 and 2, it may be possible to adopt a configuration in which an aperture diaphragm is used instead of the ND filter 13, or only the shutter blades 12 are used.

Figure 3:
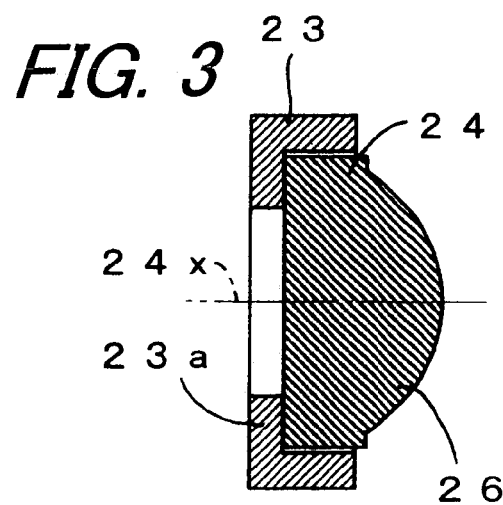
FIG. 3 is a side sectional view parallel to the optical axis, including a lens and a barrel that are principal parts of a lens-shutter coupling unit according to another embodiment of the invention.

FIG. 3 shows a sectional configuration including a lens 24 and a barrel 23 that are principal parts of a lens-shutter coupling unit according to another embodiment of the invention. The lens holder 1 and the shutter unit 5 that are the same as those of the embodiment of FIGS. 1 and 2 are used. The lens 24 is not necessarily constituted of three lenses as shown in FIG. 1. For example, a portion of an outer periphery of only one lens 24 may be fixed by the barrel 3, and the protruding part 26 may be formed on one side of the optical axis 24x. A diaphragm part 23a is provided on the other side of the optical axis 24x. It should be noted herein that the lens 4b has only to be held by the barrel 3 by using the combined lenses 4b and 4c like the embodiment described above and the protruding amount of the protruding part 16 can be increased to further broaden the arrangement space for the shutter driving part 14 and the filter driving part 15, which is more preferable.

Figure 4:
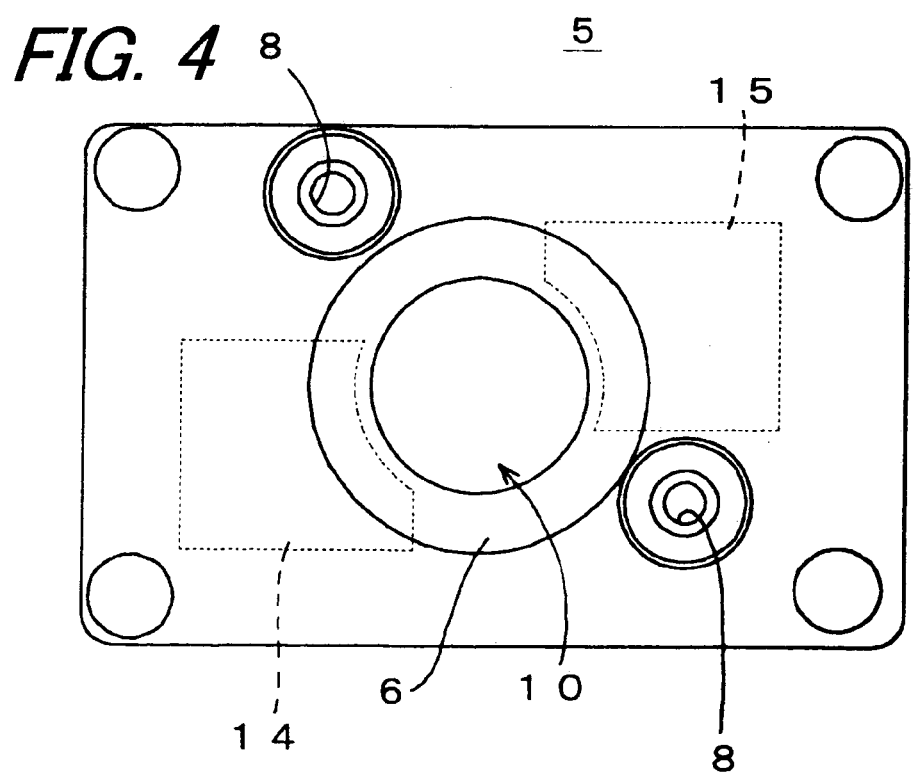
FIG. 4 is a front view perpendicular to the optical axis, showing the arrangement position of the driving parts in the shutter unit in a case where both the shutter driving part and the filter driving part are used like the embodiment of FIG. 1.

FIG. 4 shows an example of the arrangement position of the shutter and filter driving parts in the shutter unit 5 in a case where both the shutter driving part 14 and the filter driving part 15 are used like the embodiment of the invention shown in FIG. 1. By disposing both the driving parts in positions that are substantially symmetrical with respect to the optical axis of the lens group 4 at the outer periphery of the opening 6, the space of the shutter unit 5 can be used effectively, which is preferable. The shutter unit 5 preferably has a rectangular external shape such that a part thereof where the shutter driving part 14 or the filter driving part 15 is disposed becomes a long side. That is, the shutter unit 5 is formed into a rectangular parallellpiped shape dimensioned so as to be thinnest in the direction of the optical axis 4x, in a state that the lens group 4 is attached. This makes it possible to reduce the volume of the shutter unit 5 and to easily form a camera itself including the lens-shutter coupling unit into a rectangular shape that is suitable for incorporation in a portable terminal, such as a portable telephone. In addition, as for the external size of the shutter unit 5, as an instance, the length of the shutter unit in a direction of a long side of the unit is about 13 mm, the length thereof in a direction of a short side of the unit is about 8 mm, and the length thereof in a thickness direction is about 3 mm.

Figure 5:
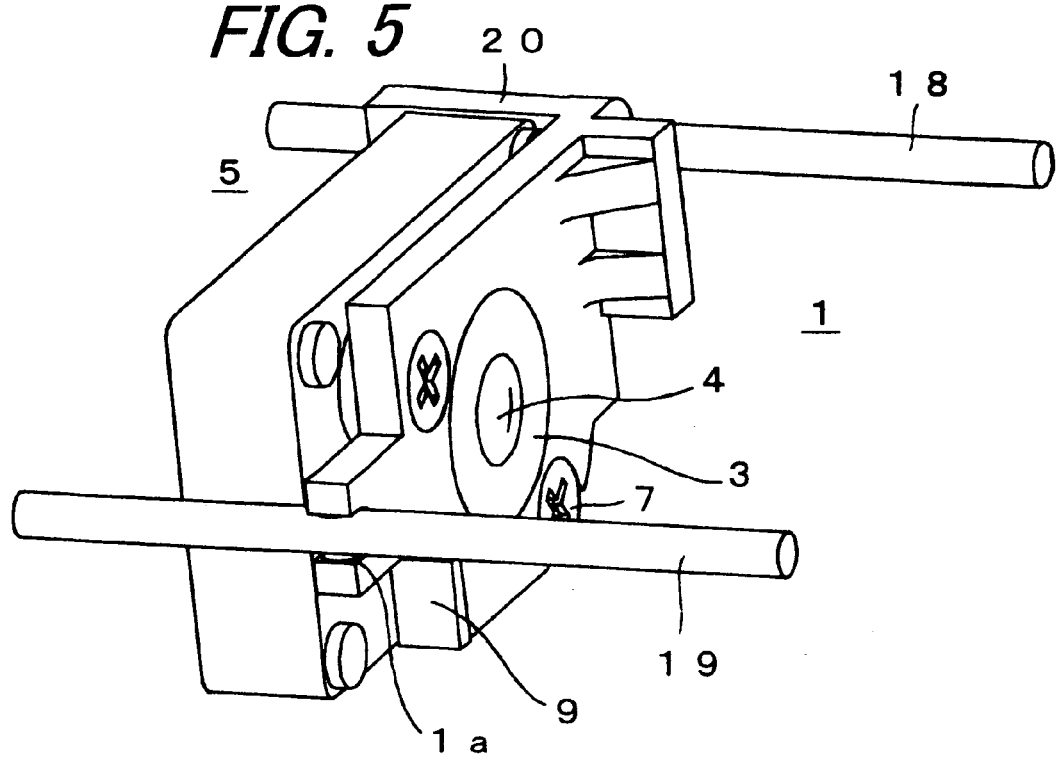
FIG. 5 is a perspective view showing a method of moving a lens holder of FIG. 1.

FIG. 5 is a perspective view showing a method of moving the lens holder 1. A guide shaft 18 and an auxiliary shaft 19 are disposed parallel to the optical axis of the lens group 4. The guide shaft 18 and the auxiliary shaft 19 are, for example, metallic rods. The guide shaft 18 passes through a bearing 20 of the lens holder 1, and the auxiliary shaft 19 passes though the rotation stopper 1a of the lens holder 1. The lens holder 1 is driven in the direction of the optical axis by a driving unit (not shown) and guided by the guide shaft 18, whereby the lens holder is moved in the direction of the optical axis. By forming the bearing 20 in the lens holder 1 that is an attaching member of the lens group 4 rather than in the shutter unit 5, the lens group 4 can be moved with high precision. Further, a portion of the shutter unit 5 may be cut out such that the guide shaft 18 and the auxiliary shaft 19 are disposed in the portion. This configuration makes it possible to further miniaturize a whole camera including the lens-shutter coupling unit.

Figure 6:
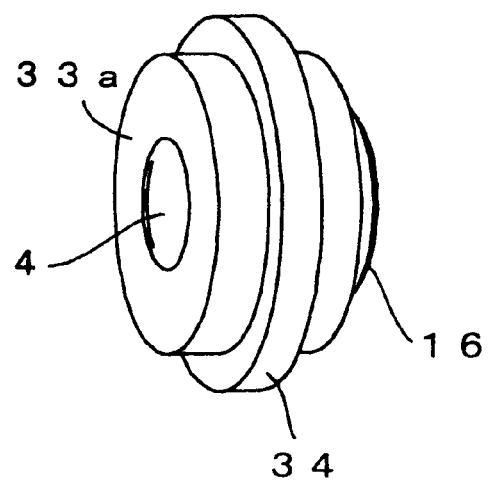
FIG. 6 is a perspective view showing another configuration of a barrel to be used for a lens-shutter coupling unit according to still another embodiment of the invention.

FIG. 6 shows another configuration of a barrel to be used for a lens-shutter coupling unit according to still another embodiment of the invention. The barrel 33 has an enlarged part 34 whose external diameter is enlarged at an outer periphery thereof rather than a simple cylindrical shape like the barrels 3 and 23 shown in FIGS. 1, 2 and 3. This enlarged part 34a constitutes a retaining part. The lens holder 1 and the shutter unit 5 that are the same as those of FIGS. 1 and 2 are used. If the enlarged part 34 is formed in a position where a gap is formed between the lens holder 1 and the shutter unit 5 in FIG. 2, the enlarged part can be sandwiched between the lens holder 1 and the shutter unit 5. By sandwiching the enlarged part 34 to fix the barrel 33, the barrel 33 can be prevented from deviating due to a falling impact, etc. Further, a diaphragm part 33a may be formed in the lens barrel 4 opposite to the protruding part 16 from the barrel 33. By restricting the diameter of a light beam entering the lens group 4 by means of the diaphragm part 33a, it becomes unnecessary to separately dispose a diaphragm, and consequently it is possible to reduce the number of components. Further, since the lens group 4 is fixed such that it is aligned with the inner diameter of the barrel 33, the lens group 4 and the diaphragm part 33a can be aligned with each other with high precision. In addition, even in the barrels 3 and 23 of FIGS. 1, 2, and 3, the diaphragm part 3a and the lens group 4 or the diaphragm part 23a and the lens 24 can similarly be aligned with each other with high precision.

Although the above-described embodiments have been described about the configuration in which the barrel 3 or 33 formed separately from the lens holder main body 1A is used as the lens fixing frame, the invention is not limited thereto. For example, a lens fixing frame may be formed integrally with a lens holder main body, and the lens group 4 may be attached directly to the lens fixing frame. In particular, in a case where the lens group 4 is a single lens, the lens is preferably attached directly to a lens holder.

As described above, in the coupling structure of the lens holder and the shutter unit in the lens-shutter coupling unit of the invention, the shutter unit can be reduced in size, and a camera or the like using the same structure can be reduced in size further. Further, the lens group can be moved with high precision, and a camera or the like can also be simply assembled with high resolution.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A lens-shutter coupling unit comprising:
   a lens holder that is movable in a direction of an optical axis, having a lens holder main body and a lens fixing frame;
   a lens group that is attached to the lens fixing frame;
   a shutter unit that is fixed to the lens holder;
   a light quantity control member that is disposed within the shutter unit; and
   a driving part that drives to move the light quantity control member so that the control member may perform a light quantity control operation,
   wherein the shutter unit is formed with an opening in a position that faces the light quantity control member,
   the lens fixing frame of the lens holder is inserted into the opening,
   the lens group attached to the lens fixing frame has a protruding part that protrudes toward the light quantity control member of the shutter unit from the lens fixing frame, and
   the driving part is disposed so as to surround the protruding part radially, and
   an entirety of a lens closest to the light quantity control member in the lens group is located between two ends of the driving part in the direction of the optical axis of the lens group.

2. The lens-shutter coupling unit of claim 1, wherein the light quantity control member is shutter blades that are movable between a position where an exposure opening of the shutter unit is shielded and a position where the exposure opening is opened.

3. The lens-shutter coupling unit of claim 1, wherein the light quantity control member is an ND filter that can be displaced between a position in the optical path within the shutter unit and a position of retreat from the optical path.

4. The lens-shutter coupling unit of claim 1, wherein the light quantity control member is both shutter blades that are movable between a position where an exposure opening of the shutter unit is shielded and a position where the exposure opening is opened, and an ND filter that can be displaced between a position in the optical path within the shutter unit and a position of retreat from the optical path, and the light quantity control member is provided with a driving part to operate the shutter blades and a driving part to operate the ND filter, and is disposed in a position that is substantially symmetrical with respect to the optical axis of the lens group.

5. The lens-shutter coupling unit of claim 1, wherein the lens group is composed of a plurality of lenses, and a lens protruding from the lens fixing frame that is to be a protruding part is bonded to a lens to be attached to the lens fixing frame.

6. The lens-shutter coupling unit of claim 1, wherein the lens group is fixed to a tubular lens fixing frame that is formed separately from the lens holder main body, and the lens fixing frame is fixed to the lens holder main body.

7. The lens-shutter coupling unit of claim 6, wherein the lens fixing frame has at an outer periphery thereof a retaining part whose outer diameter is greater than those of other parts.

8. The lens-shutter coupling unit of claim 1, wherein the lens fixing frame has a diaphragm part that restricts the diameter of light entering the lens group, on a side opposite to the protruding part in the direction of the optical axis.

9. The lens-shutter coupling unit of claim 1, wherein the shutter unit has a rectangular external shape such that a part thereof where the driving part is disposed becomes a long side.

10. The lens-shutter coupling unit of claim 1, wherein the lens holder is formed integrally with a bearing part into which a guide shaft that guides movement of the lens holder in the direction of the optical axis is to be inserted.

* * * * *